(12) United States Patent
Sakaue

(10) Patent No.: US 8,357,063 B2
(45) Date of Patent: Jan. 22, 2013

(54) BELT TYPE CONTINUOUSLY VARIABLE TRANSMISSION, CONTROL DEVICE FOR BELT TYPE CONTINUOUSLY VARIABLE TRANSMISSION, AND VEHICLE

(75) Inventor: Masaya Sakaue, Shizuoka (JP)

(73) Assignee: Yamaha Hatsudoki Kabushiki Kaisha, Iwata-shi (JP)

( * ) Notice: Subject to any disclaimer, the term of this patent is extended or adjusted under 35 U.S.C. 154(b) by 653 days.

(21) Appl. No.: 12/013,900

(22) Filed: Jan. 14, 2008

(65) Prior Publication Data
US 2008/0214340 A1  Sep. 4, 2008

(30) Foreign Application Priority Data
Jan. 15, 2007  (JP) .................................. 2007-005670

(51) Int. Cl.
*F16H 61/00*  (2006.01)
(52) U.S. Cl. ............................................ 474/28; 474/18
(58) Field of Classification Search ................. 474/8–29
See application file for complete search history.

(56) References Cited

U.S. PATENT DOCUMENTS

| | | | | |
|---|---|---|---|---|
| 4,458,558 A | * | 7/1984 | Frank ........................ 74/665 GE |
| 4,590,561 A | | 5/1986 | Abo et al. | |
| 6,217,478 B1 | | 4/2001 | Vohmann et al. | |
| 2004/0116220 A1 | * | 6/2004 | Yamamoto et al. ............. 474/18 |
| 2004/0171444 A1 | * | 9/2004 | Yamamoto et al. ............. 474/28 |
| 2004/0171445 A1 | * | 9/2004 | Yamamoto et al. ............. 474/28 |
| 2004/0214669 A1 | * | 10/2004 | Katou et al. .................... 474/28 |
| 2007/0004543 A1 | * | 1/2007 | Ishida ............................ 474/8 |

FOREIGN PATENT DOCUMENTS

| | | |
|---|---|---|
| DE | 198 31 502 A1 | 1/2000 |
| EP | 1 403 569 A2 | 3/2004 |
| JP | 04-210156 | 7/1992 |
| JP | 07-158706 | 6/1995 |
| WO | WO 2006/009014 A1 | 1/2006 |

* cited by examiner

*Primary Examiner* — William E Dondero
*Assistant Examiner* — Robert T Reese
(74) *Attorney, Agent, or Firm* — Rabin & Berdo, P.C.

(57) ABSTRACT

A belt type continuously variable transmission for a vehicle such as a motorcycle includes a primary sheave and a secondary sheave each having a pair of flanges axially movable relative to each other. A belt is wound around the sheaves. An actuator controlled by a control device moves the flanges. The control device includes a determination section for determining whether the actual gear ratio of the belt type continuously variable transmission has become a predetermined gear ratio for TOP or LOW, and a first correction section for correcting an operation amount of the actuator based on the determination made by the determination section. Control accuracy in a region where the gear ratio is TOP or LOW is thereby improved.

30 Claims, 11 Drawing Sheets

BELT TYPE CONTINUOUSLY VARIABLE TRANSMISSION, CONTROL DEVICE FOR BELT TYPE CONTINUOUSLY VARIABLE TRANSMISSION, AND VEHICLE

RELATED APPLICATIONS

This application claims the benefit of priority under 35 USC 119 of Japanese patent application no. 2007-005670, filed on Jan. 15, 2007, which application is hereby incorporated by reference in its entirety.

BACKGROUND OF THE INVENTION

1. Field of the Invention

The present invention relates to a belt type continuously variable transmission and a control device for a belt type continuously variable transmission.

2. Description of Related Art

A belt type continuously variable transmission includes a primary sheave and a secondary sheave, each having a groove with a variable width. The primary sheave is mounted on a primary shaft to which an output from a power source such as an engine is input, and the secondary sheave is mounted on a secondary shaft from which an output for a driving wheel is output. In general, the primary and secondary sheaves are each made up of a fixed flange and a movable flange defining a V-groove therebetween. Each movable flange is movable in an axial direction of the primary or secondary shaft. A V-belt is wound around both sheaves. The gear ratio of the belt type continuously variable transmission is varied by moving the movable flange to vary the groove widths of both sheaves.

Some V-belt type continuously variable transmissions include a control device for controlling an actuator for moving the movable flange of the primary sheave. The control device calculates a target gear ratio based on vehicle information such as throttle opening degree and vehicle speed, for example. In order to move the movable flange to a target position, the control device sends a control signal to the actuator to control the position of the movable flange. Such V-belt type automatic continuously variable transmissions are applied, for example, to vehicles such as motorcycles (see JP-B-3043061, for example).

JP-A-Hei 7-158706 includes a position sensor for detecting the position of the movable flange. JP-A-Hei 7-158706 discloses that factors such as variations in output characteristics of the position sensor, changes over time in the characteristics, and elongation and wear of the V-belt impair the consistency of the correlation between the value detected by the position sensor and the position of the movable flange. JP-A-Hei 7-158706 further discloses self-correction of data of the impaired consistency of the correlation based on the ratio between the speeds of the primary and secondary sheaves.

The transmission control method disclosed in JP-A-Hei 7-158706, however, requires complicated processes such as determination of the presence/absence of a slip of the belt, calculation of an input torque, and so forth.

Various control methods with less variations in the correlation described above among vehicles and with less influence of such variations on control have been conceived. For example, the correlation can be corrected by performing measurement over the entire movable range of the movable flange. Such correction needs to be made for each vehicle, and cannot treat changes over time. Another method calculates an actual gear ratio and uses the calculation results as feedback in order to control the gear ratio of the belt type continuously variable transmission. In this method, however, the gearshift response of the vehicle is worsened. Therefore, it is desirable to improve control accuracy in an easier way.

SUMMARY OF THE INVENTION

In a belt type continuously variable transmission in accordance with the present invention, a belt is wound around a primary sheave and a secondary sheave each having a pair of flanges axially movable relative to each other. An actuator controlled by a control device moves the flanges. The control device includes a determination section for determining whether an actual gear ratio of the belt type continuously variable transmission has become a predetermined gear ratio for TOP or LOW; and a first correction section for correcting an operation amount of the actuator based on the determination made by the determination section.

In one embodiment, the determination section determines whether the actual gear ratio has become the predetermined gear ratio for TOP. Where the determination section determines that the actual gear ratio has become the predetermined gear ratio for TOP before completion of control to move the flange to a target position where a gear ratio of the belt type continuously variable transmission would become TOP, the first correction section may correct the operation amount of the actuator set by the control device such that the actual gear ratio will not become any smaller.

In another embodiment, where the determination section does not determine that the actual gear ratio has become the predetermined gear ratio for TOP even after completion of control to move the flange to a target position where a gear ratio of the belt type continuously variable transmission would become TOP, the first correction section may correct the operation amount of the actuator set by the control device such that the actual gear ratio will become the predetermined gear ratio for TOP. In this case, the first correction section may correct the operation amount of the actuator set by the control device such that the actual gear ratio will become smaller according to an increase of a vehicle speed.

The primary sheave and the secondary sheave may each include a fixed flange and a movable flange respectively mounted on a rotary shaft. A width of a groove of the primary sheave may be adjusted by moving the movable flange of the primary sheave with the actuator, and the movable flange of the secondary sheave may be urged in a direction of reducing a width of a groove of the secondary sheave.

A flange position detection sensor for detecting a position of the flange may be provided. In this case, the control device may include a target gear ratio setting section for setting a target gear ratio; a first storage section for storing correlation between a detection value of the flange position detection sensor and the gear ratio; and an operation amount setting section for setting the operation amount of the actuator based on information including the correlation stored in the first storage section such that the gear ratio of the belt type continuously variable transmission will become the target gear ratio set by the target gear ratio setting section.

A second storage section for storing the predetermined gear ratio for TOP or LOW, and an actual gear ratio detection section for detecting the actual gear ratio may also be provided. The determination section may determine whether the actual gear ratio detected by the actual gear ratio detection section has become the predetermined gear ratio for TOP or LOW based on the predetermined gear ratio for TOP or LOW stored in the second storage section. The first correction section may correct the operation amount of the actuator set by the operation amount setting section based on the determination made by the determination section.

The flange position detection sensor may be an angle sensor mounted on a rotary shaft for rotation in conjunction with a mechanism for moving the flange.

The flange position detection sensor may be a sensor of which reference is set to a first state where the flange is positioned on one side of its movable range, and of which detection value changes according to an amount of movement of the flange toward a second state where the flange is positioned on the other side of the movable range. The first storage section may store reference correlation between the detection value of the flange position detection sensor and the gear ratio. In this case, the control device may include a second correction section for correcting the reference correlation stored in the first storage section based on a ratio of $\Delta A/\Delta B$ in a state closer to the second state, $\Delta A$ being a change amount of the detection value of the flange position detection sensor at a time when the actual gear ratio has become a predetermined gear ratio, and $\Delta B$ being a change amount of the detection value of the flange position detection sensor derived based on the reference correlation stored in the first storage section.

The first state may be on a side where the gear ratio of the belt type continuously variable transmission is LOW, or a side where the gear ratio thereof is TOP.

The actual gear ratio detection section may calculate the actual gear ratio based on a ratio between an input speed to and an output speed from the belt type continuously variable transmission.

According to the present invention, since the control device includes a determination section for determining whether or not the actual gear ratio of the belt type continuously variable transmission has become a predetermined gear ratio for TOP or LOW, and a first correction section for correcting an operation amount of the actuator based on the determination made by the determination section, the control accuracy in the region where the gear ratio is TOP or LOW is improved.

In addition, according to an embodiment of the present invention, since a second correction section for correcting the reference correlation stored in the first storage section based on a ratio of $\Delta A/\Delta B$ is provided, the deviation in the correlation described above over the entire region of the gear ratio can be corrected easily. As a result, control accuracy of the belt type continuously variable transmission is improved in a relatively easy way.

Other features and advantages of the invention will be apparent from the following detailed description, taken in conjunction with the accompanying drawings which illustrate, by way of example, various features of embodiments of the invention.

DETAILED DESCRIPTION OF THE INVENTION

Figure 1:
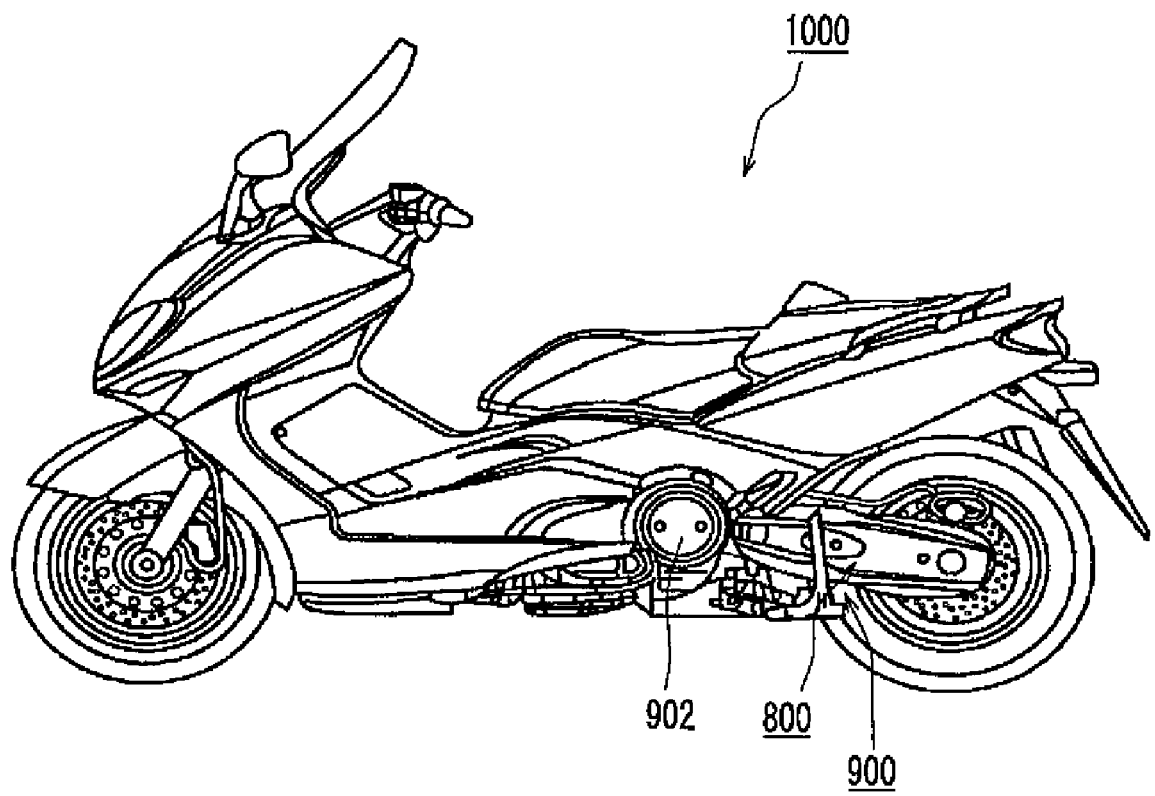
FIG. 1 is a side view of a motorcycle having a belt type continuously variable transmission in accordance with an embodiment of the present invention.

A belt type continuously variable transmission in accordance with an embodiment of the present invention is now described with reference to the drawings. In the drawings, the same reference numeral is given to members and parts having the same function. It should be understood that the present invention is not limited to the embodiment described below.

Figure 2:
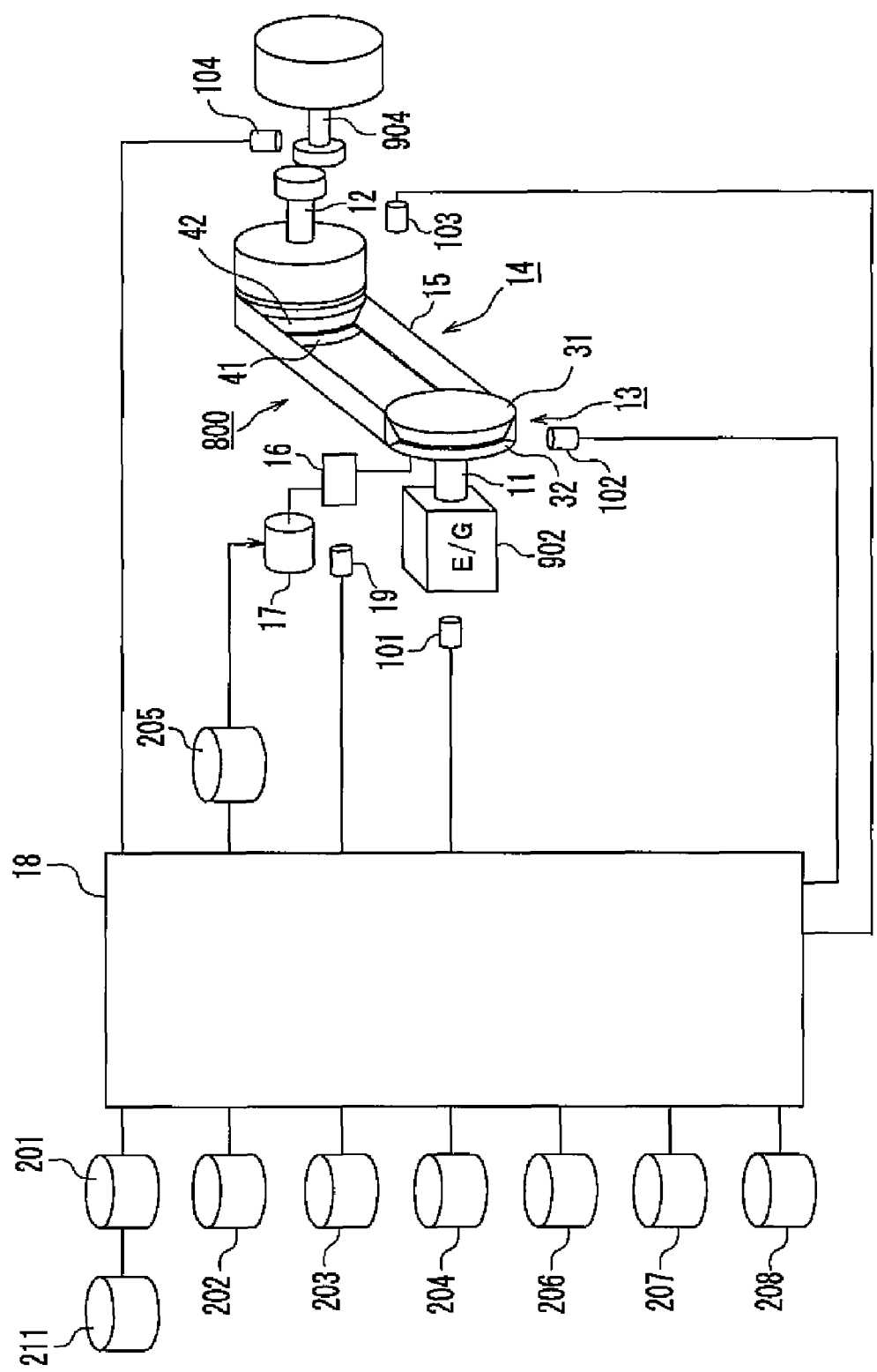
FIG. 2 is a schematic diagram of the belt type continuously variable transmission in accordance with the embodiment of the present invention.

As shown in FIG. 2, a belt type continuously variable transmission 800 has a primary sheave 13 and a secondary sheave 14 each having a pair of flanges (31, 32), (41, 42) axially movable relative to each other. A belt 15 is wound around sheaves 13, 14. An actuator 17 controlled by a control device 18 moves flanges (31, 32), (41, 42) to vary the groove width of sheaves 13, 14 in order to vary the gear ratio.

A flange position detection sensor 19 for detecting the position of flange 32 is connected to control device 18. Flange position detection sensor 19 can also detect the operation amount of actuator 17.

Figure 8:
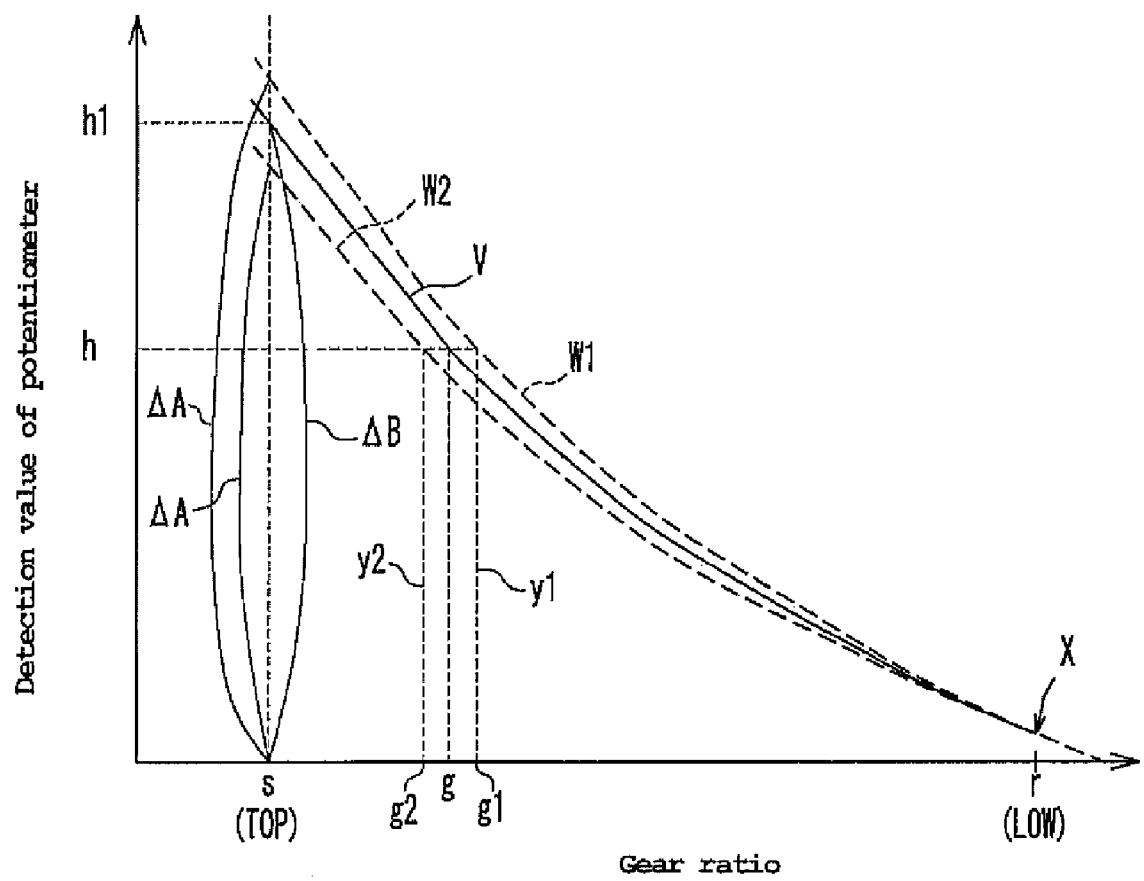
FIG. 8 is a graph showing a correlation between a detection value of the potentiometer and a gear ratio of the belt type continuously variable transmission in accordance with the embodiment of the present invention.

There is correlation between the detection value of flange position detection sensor 19 and the gear ratio. For example, as shown in FIG. 8, reference correlation v can be set based on a sensor reference position in consideration of the design output characteristics of flange position detection sensor 19 and so forth. In the example shown in FIG. 8, a potentiometer is used as flange position detection sensor 19. In this example, the sensor reference position of the flange position detection sensor is set to a position where the gear ratio is LOW, and the detection value of the flange position detection sensor becomes larger as the gear ratio becomes closer to TOP.

Figure 7:
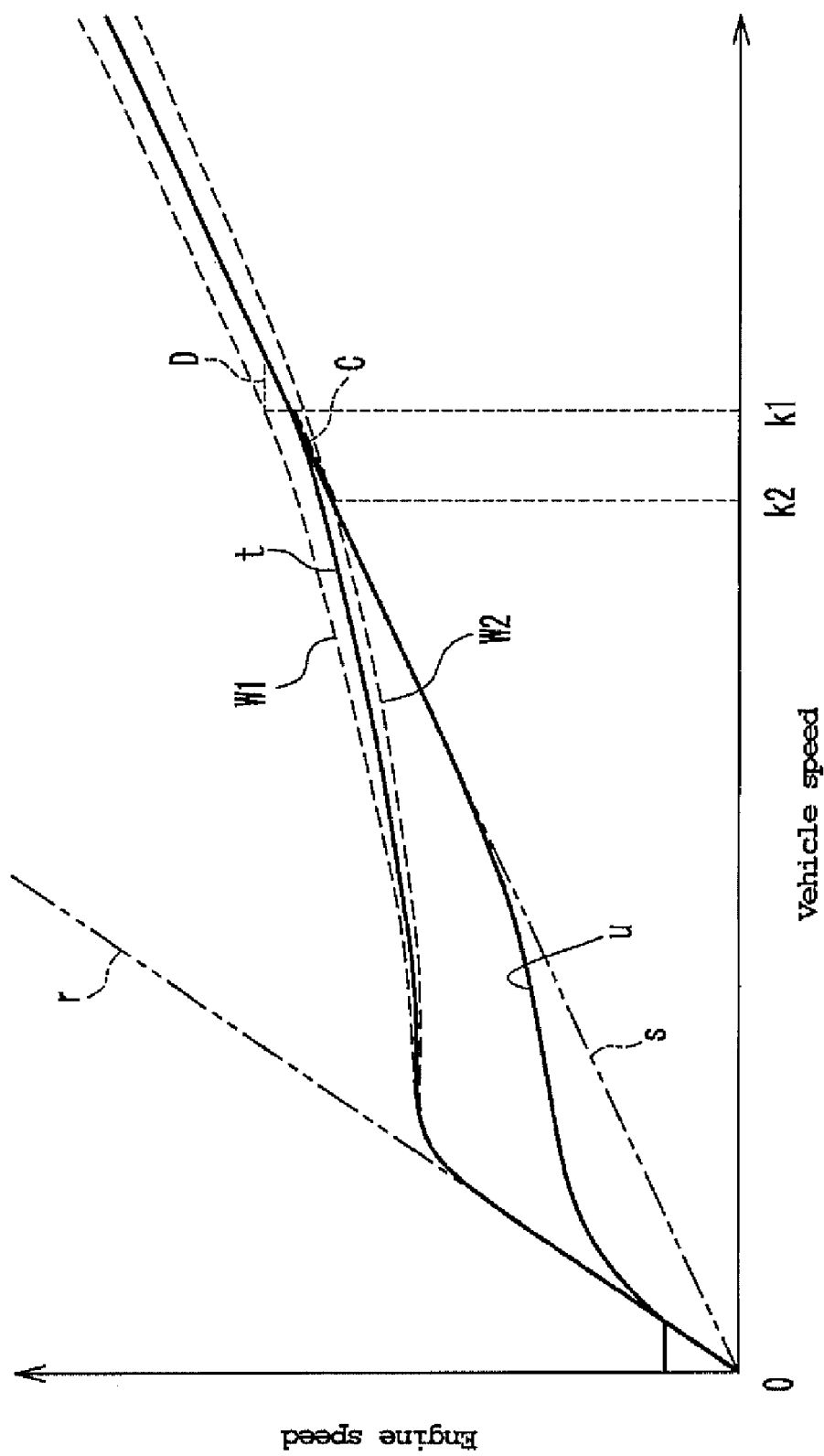
FIG. 7 is a gear ratio map of the belt type continuously variable transmission in accordance with the embodiment of the present invention.

In general, however, there are individual differences in the output characteristics of flange position detection sensor 19. Therefore, as shown in FIG. 8, the correlation between the detection value of flange position detection sensor 19 and the gear ratio may be deviated from reference correlation v to the LOW side (w1) or the TOP side (w2). In the case where the correlation between the detection value of flange position detection sensor 19 and the gear ratio is deviated from reference correlation v as described above, in controlling the gear ratio based on the detection value of flange position detection sensor 19, the gear ratio may deviate from a target gear ratio as a control target as the flange moves away from sensor reference position x. That is, as shown in FIG. 7, the gear ratio (w1, w2) to be actually achieved by the control deviates from target gear ratio t.

In view of the above circumstances, the present inventors discussed the possibility of developing an easy method to improve control accuracy. As a result, the inventors thought it desirable to control the gear ratio to a predetermined gear ratio set in advance as accurately as possible at the position for TOP or LOW, which is distant from the sensor reference position and where the deviation in the correlation described above is larger. In addition, the inventors have found that even in the case where the deviation in the correlation described above has led to the deviation of the gear ratio from the target gear ratio, the influence of the deviation of the gear ratio from the target gear ratio is tolerated in the middle region between the TOP region and the LOW region.

The inventors have also found a method to improve control accuracy in the region where the gear ratio is TOP or LOW. The inventors have further found an easy method to correct the deviation in the correlation described above over the entire region of the gear ratio. An embodiment of the present invention is now described in detail.

As shown in FIG. 1, a belt type continuously variable transmission 800 is provided to a power unit 900 of a motorcycle 1000. As shown in FIG. 2, belt type continuously variable transmission 800 includes a primary shaft 11, a secondary shaft 12, a primary sheave 13, a secondary sheave 14, a V-belt 15, a groove width adjustment mechanism 16, an actuator 17, a control device 18, and a flange position detection sensor 19.

Figure 3:
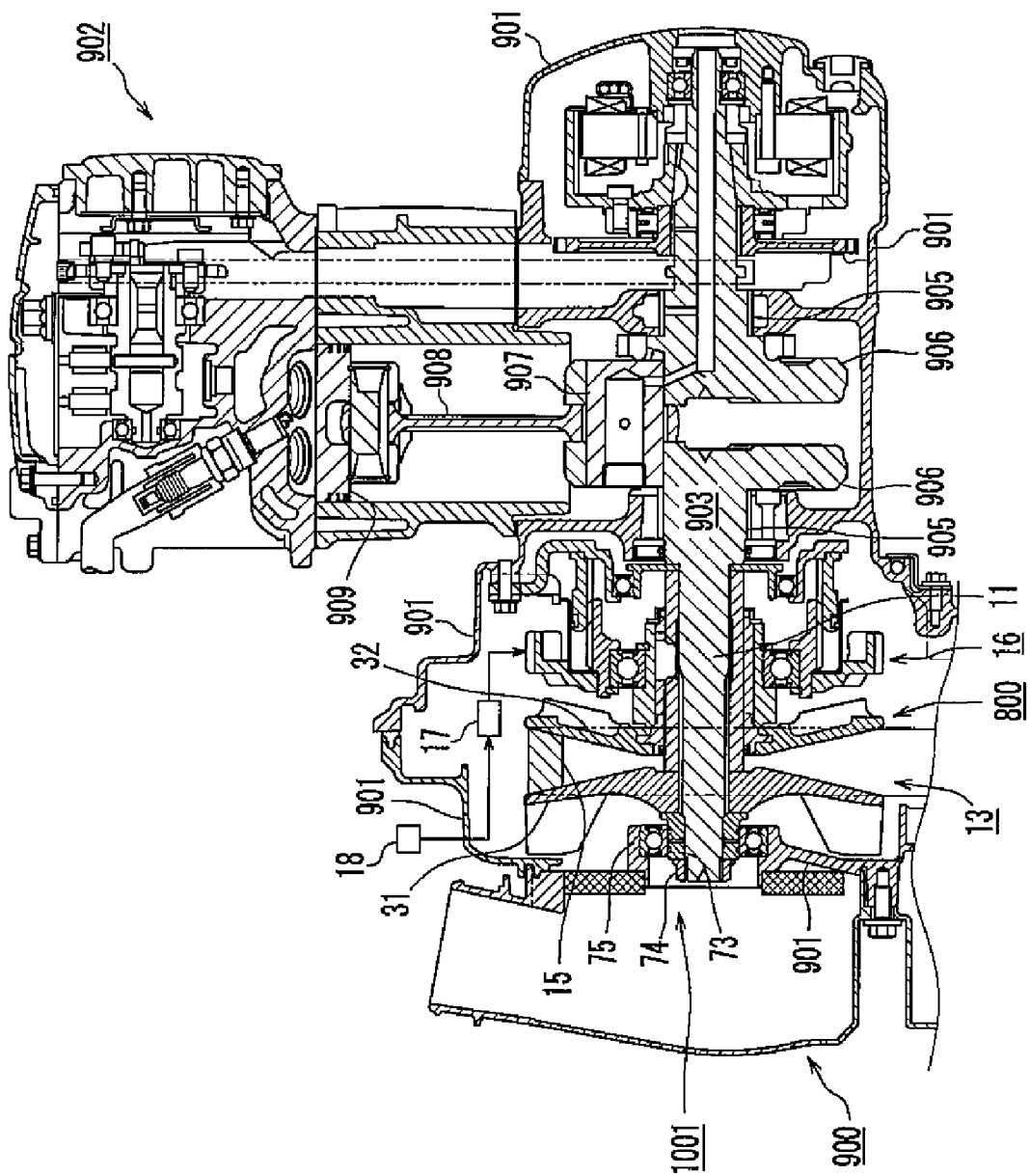
FIG. 3 is a partial cross sectional view of the belt type continuously variable transmission in accordance with the embodiment of the present invention.
Figure 4:
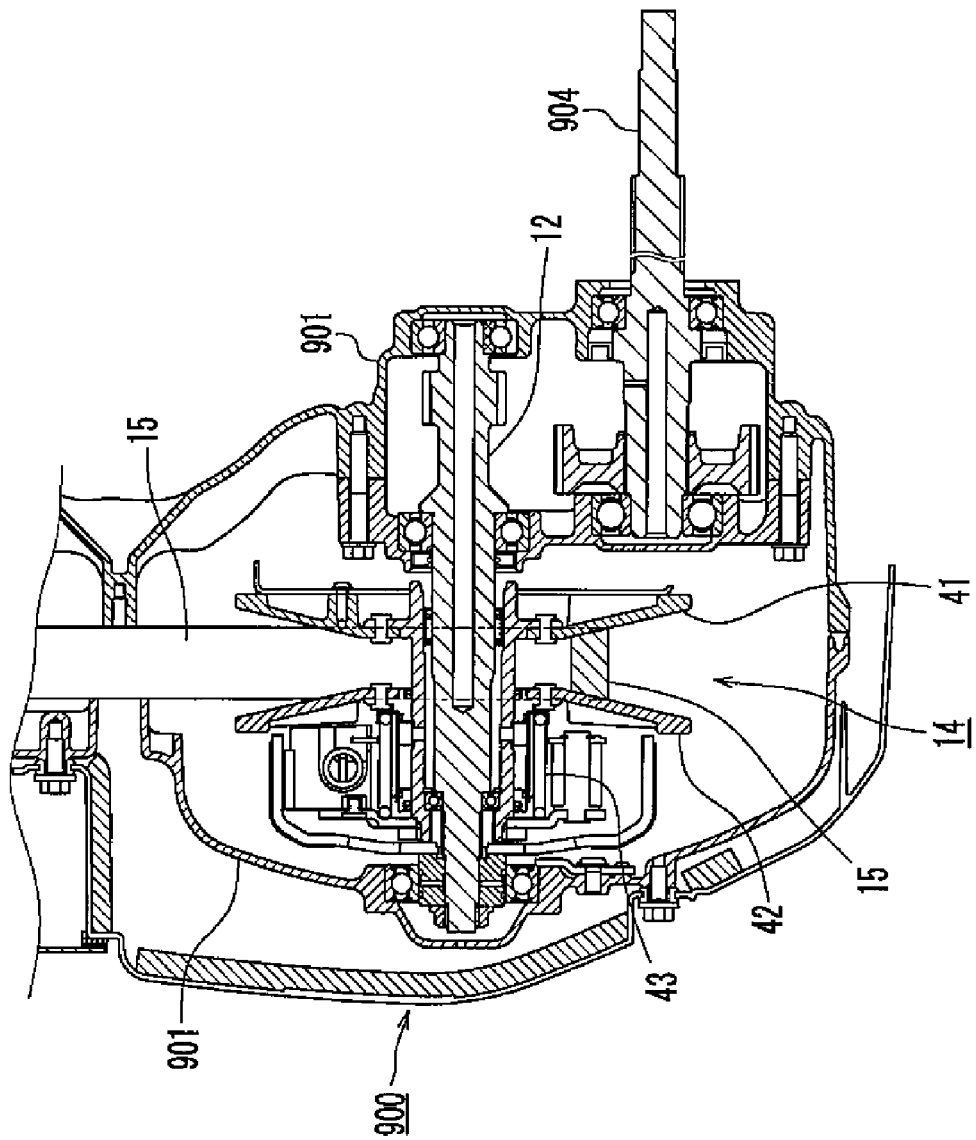
FIG. 4 is a partial cross sectional view of the belt type continuously variable transmission in accordance with the embodiment of the present invention.

As shown in FIGS. 3 and 4, primary shaft 11 and secondary shaft 12 are mounted to a case 901 of power unit 900 via bearings. Primary shaft 11 is formed integrally with a crankshaft 903 as an output shaft of an engine 902. Secondary shaft 12 is disposed in parallel to primary shaft 11 and coupled to a drive shaft 904. Various members including a crank journal 905, a crank web 906, a crank pin 907, a connecting rod 908, and a piston 909 are coupled to crankshaft 903.

Primary sheave 13 and secondary sheave 14 each includes a fixed flange (31, 41) and a movable flange (32, 42) respectively mounted on a rotary shaft primary shaft 11 and secondary shaft 12). Movable flange 42 of secondary sheave 14 is urged in a direction of reducing the groove width of secondary sheave 14. Movement of movable flange 32 of primary sheave 13 is controlled by control device 18. Fixed flange (31, 41) and movable flange (32, 42) define a V-groove for receiving a belt therebetween. V-belt 15 is wound through the V-grooves of primary sheave 13 and secondary sheave 14 to transmit rotational driving force between both sheaves (13, 14). Movement of movable flange (32, 42) in the axial direction of primary shaft 11 and secondary shaft 12 varies the groove width of the V-grooves, which varies the gear ratio of belt type continuously variable transmission 800.

Groove width adjustment mechanism 16 moves movable flange 32 of primary sheave 13 to adjust the groove width of primary sheave 13. Actuator 17 drives groove width adjustment mechanism 16. In this embodiment, the groove width of primary sheave 13 is adjusted by moving movable flange 32 of primary sheave 13 with actuator 17.

Primary sheave 13 and groove width adjustment mechanism 16 are both mounted on primary shaft 11. A spline 51 is formed on primary shaft 11, and male threads 52 for attachment of a locknut 74 are formed at an end of primary shaft 11.

Figure 5:
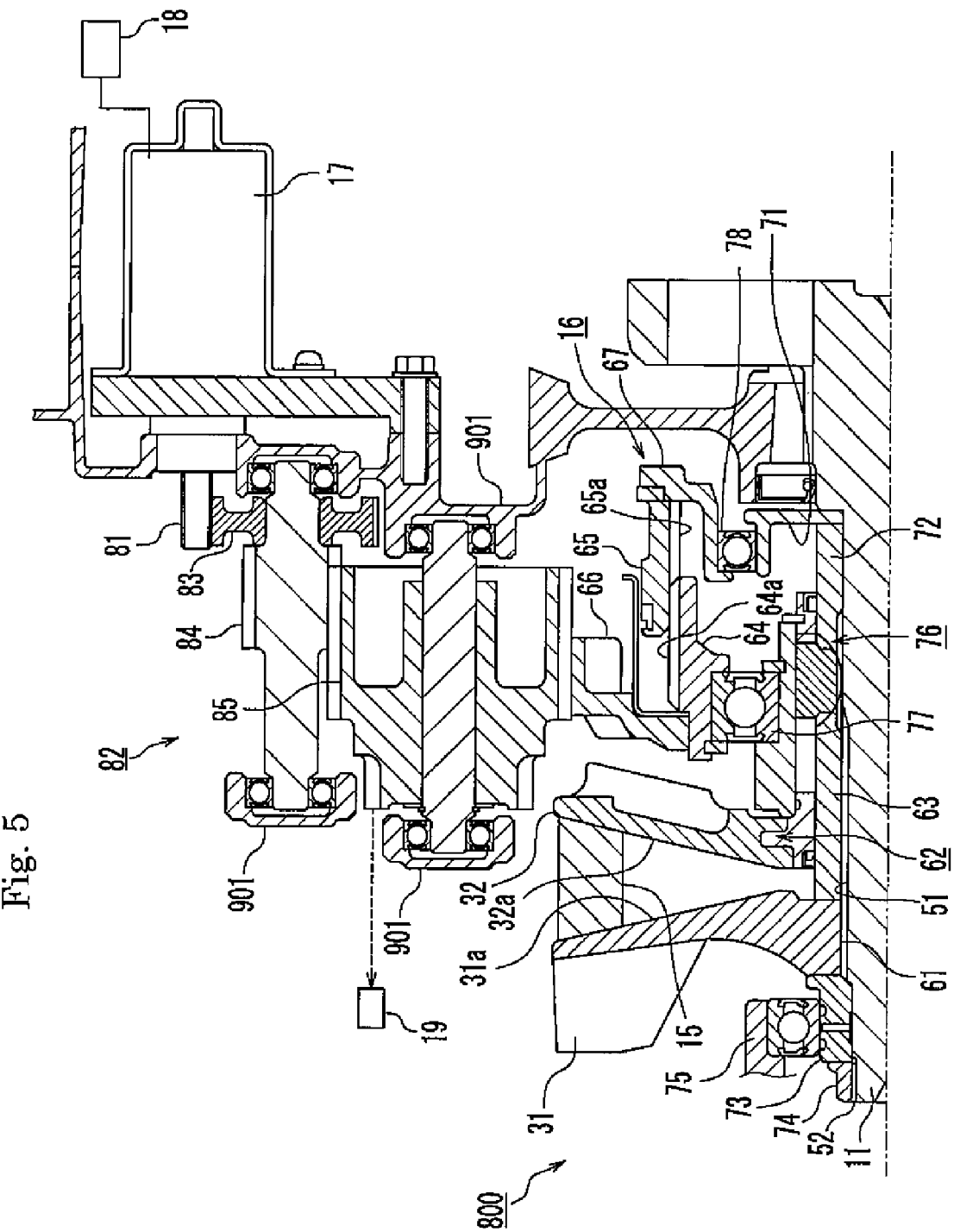
FIG. 5 is a cross sectional view of a primary sheave of the belt type continuously variable transmission in accordance with the embodiment of the present invention.

As shown in FIG. 5, primary sheave 13 is made up of fixed flange 31 and movable flange 32. Fixed flange 31 is fixed on the distal end side, and movable flange 32 is disposed on the base end side so as to be axially movable relative to primary shaft 11. In this embodiment, fixed flange 31 and movable flange 32 of primary sheave 13 are each a generally disk-shaped member, and respectively have circular conical surfaces 31a, 32a facing each other in the axial direction. The respective circular conical surfaces 31a, 32a of fixed flange 31 and movable flange 32 define a V-groove for receiving V-belt 15 therebetween.

An insertion hole 61 for receiving primary shaft 11 therethrough is formed at the center of fixed flange 31, and a spline for engagement with spline 51 of primary shaft 11 is formed on the inner peripheral surface of insertion hole 61. A mount part 62 for attachment to groove width adjustment mechanism 16 is formed at the center of movable flange 32. Groove width adjustment mechanism 16 includes a slider 63, a feed member 64, a guide member 65, a gear 66 and a fixed support member 67. Primary sheave 13 and groove width adjustment mechanism 16 are mounted on primary shaft 11 by a rotary support member 71, a first sleeve 72, a second sleeve 73 and a locknut 74.

Rotary support member 71, first sleeve 72, fixed flange 31, second sleeve 73 and locknut 74 are sequentially mounted on primary shaft 11. First sleeve 72 and fixed flange 31 are meshed with spline 51 of primary shaft 11 to rotate together with primary shaft 11. Second sleeve 73 is mounted on primary shaft 11 with an end in abutment with fixed flange 31. Locknut 74 is screwed on male threads 52 formed at an end of primary shaft 52. The end of primary shaft 11 is rotatably supported by a bearing 75 mounted between second sleeve 73 and case 901.

First sleeve 72 includes a guide mechanism 76 disposed along the axial direction. Slider 63 of groove width adjustment mechanism 16 is mounted to first sleeve 72 so as to be movable along the axial direction by means of guide mechanism 76. Movable flange 32 is mounted to slider 63. Feed member 64 and gear 66 are mounted to slider 63 via a bearing 77. Male threads 64a are formed on the outer peripheral surface of feed member 64, and are meshed with female threads 65a formed on the inner peripheral surface of guide member 65 fixed to case 901.

Guide member 65 of groove width adjustment mechanism 16 is mounted via a bearing 78 to rotary support member 71 mounted on primary shaft 11, and mounted to fixed support member 67 fixed to case 901. Thus, guide member 65 is fixed to case 901 so as not to rotate as primary shaft 11 rotates.

In this embodiment, an electric motor is used as actuator 17. An output shaft 81 of electric motor 17 transmits power to gear 66 via a plurality of gears 83-85 of a gear transmission mechanism 82. Gears 83-85 are mounted to case 901 of power unit 900 via bearings. Gear transmission mechanism 82 decelerates the output of electric motor 17, and transmits the power to gear 66 of groove width adjustment mechanism 16.

As shown in FIG. 2, the output of electric motor 17 is controlled by electricity supplied to electric motor 17 based on a control signal of control device 18. Electricity supplied to electric motor 17 may be controlled in a PWM (Pulse Wide Modulation) method, for example. In the PWM method, the output of electric motor 17 is controlled by varying the ON/OFF time ratio (duty ratio) of electric motor 17 with the voltage of the supplied electricity kept constant. The output of electric motor 17 may be controlled in ways other than the PWM method as long as it is controlled suitably. For example, the output of electric motor 17 may be controlled by varying the voltage of the supplied electricity in an analog fashion.

Electric motor 17 is electrically connected to control device 18 (gearshift control device). Control device 18 comprises an electronic control unit (ECU) that includes a calculation section (microcomputer (MPU)) and a storage section (memory), for example. Control device 18 receives vehicle information from various sensors mounted on the vehicle.

Movable flange 32 moves in the axial direction together with slider 63 as electric motor 17 rotates with feed member 64 meshed with guide member 65. The position of movable flange 32 is detected by flange position detection sensor 19.

Figure 6:
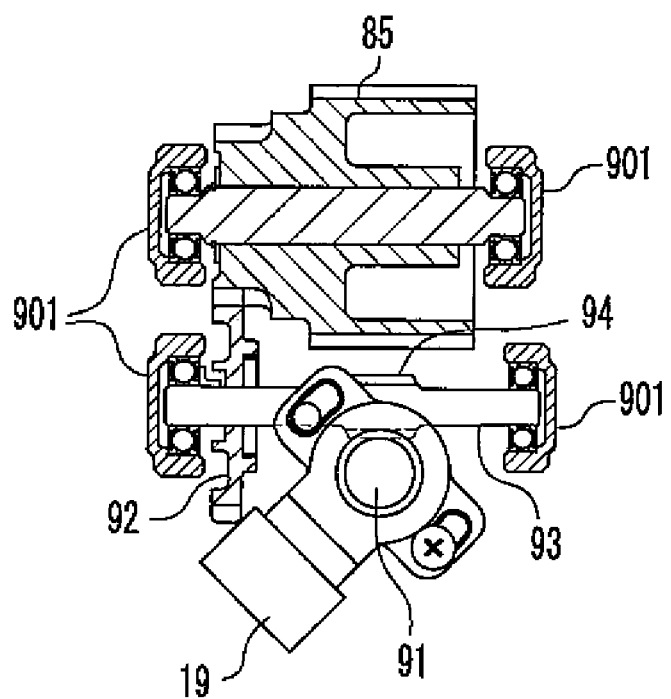
FIG. 6 is a partial cross sectional view of a mounting structure of a potentiometer of the belt type continuously variable transmission in accordance with the embodiment of the present invention.

As shown in FIG. 6, flange position detection sensor 19 comprises a potentiometer 19 (angle sensor) mounted on a rotary shaft for rotation in conjunction with the mechanism for moving the flange (groove width adjustment mechanism 16). A rotary shaft 91 of potentiometer 19 is meshed with a worm 94 formed on a gear shaft 93 of a gear 92 for meshing engagement with gear 85 of gear transmission mechanism 82. Potentiometer 19 is mounted to case 901 of power unit 900. The resistance value of potentiometer 19 is varied according to the operation amount of electric motor 17. There is correlation among the detection value of potentiometer 19, the operation amount of electric motor 17, the position of movable flange 32, and the gear ratio of belt type continuously variable transmission 800. Therefore, potentiometer 19 can detect not only the operation amount of electric motor 17, but also the position of movable flange 32 of primary sheave 13 and the gear ratio of belt type continuously variable transmission 800.

Groove width adjustment mechanism 16 includes a stopper (not shown) for restricting movement of movable flange 32 on a side of the movable range of movable flange 32 where the groove width of primary sheave 13 is larger (LOW). Potentiometer 19 is mounted to gear transmission mechanism 82 with movable flange 32 moved to the side where the gear ratio of belt type continuously variable transmission 800 is LOW and in abutment with the stopper. Movement of movable flange 32 is restricted by stoppers 98, 99 on the side where the gear ratio of belt type continuously variable transmission 800 is LOW. In this state, potentiometer 19 is mounted to gear transmission mechanism 82 and sensor calibration is performed. Therefore, the detection value of potentiometer 19 is generally constant in the state where the gear ratio of belt type continuously variable transmission 800 is LOW.

Control device 18 calculates an operation amount of electric motor 17. Specifically, control device 18 calculates a target gear ratio of belt type continuously variable transmission 800 as a control target according to a preset program based on received vehicle information. Control device 18 then calculates an operation amount of electric motor 17 based on the correlation between the detection value of flange position detection sensor 19 and the gear ratio, the correlation between the detection value of flange position detection sensor 19 and the operation amount of electric motor 17, or the like, such that the gear ratio of belt type continuously variable transmission 800 will become the target gear ratio. Control device 18 then outputs an operation signal to electric motor 17 based on the calculated operation amount of electric motor 17.

As shown in FIG. 2, control device 18 includes a target gear ratio setting section 201, a first storage section 202, a second storage section 203, an actual gear ratio detection section 204, an operation amount setting section 205, a determination section 206 and a first correction section 207.

In addition, as shown in FIG. 2, various sensors such as a throttle position sensor (TPS) 101, an engine speed sensor 102 and vehicle speed sensors 103, 104 are electrically connected to control device 18, aside from flange position detection sensor 19 described above, so that information on various states of the vehicle can be obtained from the various sensors. Throttle position sensor (TPS) 101 senses the accelerator opening degree (throttle opening degree). Engine speed sensor 102 senses the engine speed, and in this embodiment is constituted of a sensor for sensing the speed of the crankshaft (primary shaft 11). Vehicle speed sensors 103, 104 detect the vehicle speed. Sensor 103 may sense the speed of secondary shaft 12, and sensor 104 may sense the speed of drive shaft 904, for example.

Target gear ratio setting section 201 sets a target gear ratio. Control device 18 stores a gear ratio map 211 defining what gear ratio belt type continuously variable transmission 800 is set to based on vehicle information such as vehicle speed and throttle opening degree, for example. The target gear ratio may be set by calculating a gear ratio as a control target from gear ratio map 211 based on vehicle information received by control device 18.

Gear ratio map 211 is set as shown in FIG. 7. FIG. 7 shows a gear ratio map set in the control device, with the horizontal axis representing vehicle speed and the vertical axis representing engine speed. A predetermined gear ratio of belt type continuously variable transmission 800 for LOW is indicated by r, and a predetermined gear ratio of belt type continuously variable transmission 800 for TOP is indicated by s. In gear ratio map 211, a target gear ratio t for acceleration at full throttle and a target gear ratio u for deceleration at fully closed throttle are set.

Target gear ratio setting section 201 first determines a position on the horizontal axis of FIG. 7 based on vehicle speed information. Target gear ratio setting section 201 then obtains a control target value of the speed of engine 902, which should be between target gear ratio u for deceleration at fully closed throttle and target gear ratio t for acceleration at full throttle, by multiplication by a predetermined coefficient in accordance with the throttle (accelerator) opening degree. In this case, the target gear ratio is set to a gear ratio closer to target gear ratio u for deceleration at fully closed throttle as the throttle opening degree is smaller, and to a gear ratio closer to target gear ratio t for acceleration at full throttle as the throttle opening degree is larger.

First storage section 202 stores reference correlation v between the detection value of potentiometer 19 (flange position detection sensor) and the gear ratio, as shown in FIG. 8. FIG. 8 shows the correlation between the detection value of potentiometer 19 and the gear ratio, which are represented by the vertical axis and the horizontal axis, respectively, in the movable range of movable flange 32. First storage section 202 stores reference correlation v between the detection value of potentiometer 19 and the gear ratio. Reference correlation v may be, for example, correlation determined in design or correlation determined based on the average value of measurements using several actual transmissions.

The detection value of potentiometer 19 is generally constant with the gear ratio of belt type continuously variable transmission 800 being LOW, as shown in FIG. 8. In order to deal with variations in the gear ratio, reference correlation v between the detection value of potentiometer 19 (flange position detection sensor) and the gear ratio is set in consideration of the average output characteristics of several potentiometers 19.

Sensor reference position x is defined as the detection value of potentiometer 19 with the gear ratio of belt type continuously variable transmission 800 being LOW. In reference correlation v, the detection value of potentiometer 19 becomes larger as movable flange 32 is moved toward the position where the gear ratio of belt type continuously variable transmission 800 is TOP.

There is correlation among the detection value of potentiometer 19, the gear ratio, the operation amount of electric motor 17, and the position of movable flange 32. Therefore, it is possible to substantially interchange the correlation between the detection value of potentiometer 19 (flange position detection sensor) and the gear ratio, the correlation between the detection value of potentiometer 19 and the operation amount of electric motor 17, and the correlation between the detection value of potentiometer 19 and the position of movable flange 32. The position of movable flange 32 to be achieved by the control is obtained based on the detection value of potentiometer 19. That is, control device 18 recognizes the position of movable flange 32 based on the detection value of potentiometer 19.

Second storage section 203 stores a predetermined gear ratio for TOP or LOW. The predetermined gear ratio for TOP or LOW is preferably determined in advance for the benefit of the design of belt type continuously variable transmission 800. In one embodiment, second storage section 203 stores a predetermined gear ratio for TOP.

Actual gear ratio detection section 204 detects an actual gear ratio of belt type continuously variable transmission 800. Here, the term "actual gear ratio" refers to the actual gear ratio of belt type continuously variable transmission 800, which can be obtained as, for example, the ratio between the rotational speed input to belt type continuously variable transmission 800 and the rotational speed output therefrom. In this embodiment, actual gear ratio detection section 204 calculates the actual gear ratio of belt type continuously variable transmission 800 based on the ratio between the input speed to and the output speed from belt type continuously variable transmission 800.

The input speed may be sensed by, for example, a sensor for directly sensing the speed of primary shaft 11, or a sensor for indirectly sensing the speed of primary shaft 11 such as a sensor for sensing the engine speed and a sensor for sensing the speed of primary sheave 13. In one embodiment, engine speed sensor 102 is used to sense the input speed. The output speed may be sensed by, for example, a sensor for directly sensing the speed of secondary shaft 12, or a sensor for indirectly sensing the speed of primary shaft 12 such as a sensor for sensing the speed of drive shaft 904 and a sensor for sensing the speed of secondary sheave 14.

Operation amount setting section 205 sets an operation amount of electric motor 17, such that the gear ratio of belt type continuously variable transmission 800 will become the target gear ratio, based on information including the correlation stored in first storage section 202. The target gear ratio is set by target gear ratio setting section 201. Then, the detection value of potentiometer 19 in accordance with the target gear ratio is calculated based on the correlation between the detection value of potentiometer 19 and the gear ratio stored in first storage section 202 such that the gear ratio of belt type continuously variable transmission 800 will become the target gear ratio. Then, the operation amount of electric motor 17 is determined based on the calculated detection value of potentiometer 19. It should be understood that the operation amount of the actuator may be set otherwise.

Control device 18 outputs an operation signal to electric motor 17 based on the operation amount of electric motor 17 set by operation amount setting section 205. Here, where the output characteristics of potentiometer 19 for gear ratios have such correlation as shown in FIG. 8, the gear ratio of belt type continuously variable transmission 800 is controlled to the target gear ratio.

In this control, where there are individual differences in the output characteristics of potentiometer 19, the gear ratio of belt type continuously variable transmission 800 may deviate from the target gear ratio. In addition, the gear ratio of belt type continuously variable transmission 800 may possibly deviate from the target gear ratio because of changes over years such as wear of the belt, allowable component tolerances, and so forth. One cause of such deviation is the deviation of the actual correlation between the detection value of potentiometer 19 and the gear ratio from reference correlation v between the detection value of potentiometer 19 and the gear ratio stored in advance in control device 18.

A stopper for restricting movement of movable flange 32 is provided on a side of the movable range of movable flange 32 where the groove width of primary sheave 13 is larger (LOW), and potentiometer 19 is mounted with movable flange 32 in abutment with the stopper (not shown), to set sensor reference position x. In this case, as shown in FIG. 8, the actual correlation w1, w2 is not significantly deviated from reference correlation v at a position close to sensor reference position x. However, as movable flange 32 is moved toward the side where the groove width of primary sheave 13 is smaller (TOP side), the distance from sensor reference position x of potentiometer 19 increases so that the actual correlation w1, w2 may deviate from reference correlation v.

Thus, the correlation between the detection value of potentiometer 19 and the gear ratio varies among vehicles, especially on the TOP side. The detection value of potentiometer 19 is under the influence of not only the output characteristics of potentiometer 19 but also changes over years such as wear of V-belt 15, component tolerances, and so forth. Such influence is larger on the TOP side.

In control device 18, target gear ratio setting section 201 sets the target gear ratio. Then, the detection value of potentiometer 19 in accordance with the target gear ratio is derived from reference correlation v shown in FIG. 8. Then, operation amount setting section 205 sets the operation amount of electric motor 17 based on the detection value of potentiometer 19.

A case where actual correlation w1 is deviated from reference correlation v such that the detection value of potentiometer 19 is larger for a gear ratio is now described. In this case, control device 18 sets a target gear ratio g, and calculates a detection value h of potentiometer 19 in accordance with target gear ratio g based on reference correlation v. Then, control device 18 actually calculates an operation amount of electric motor 17 based on detection value h of potentiometer 19 to operate electric motor 17. Therefore, a gear ratio g1 of belt type continuously variable transmission 800 to be achieved by the control is deviated from target gear ratio g to the LOW side by an amount of deviation of actual correlation w1 to the LOW side, as indicated by y1.

During acceleration at full throttle, as shown in FIG. 7, actual gear ratio w1 is deviated to the LOW side from set target gear ratio t. Therefore, there occurs a problem that actual gear ratio w1 does not become predetermined gear ratio s for TOP even at a control completion timing k1.

A case where actual correlation w2 is deviated from reference correlation v such that the detection value of potentiometer 19 is smaller for a gear ratio, as shown in FIG. 8, is now described. In this case, a gear ratio g2 of belt type continuously variable transmission 800 to be achieved by the control performed by control device 18 is deviated from target gear ratio g to the TOP side by an amount of the deviation of actual correlation w2 to the TOP side, as indicated by y2. On gear ratio map 211, as shown in FIG. 7, actual gear ratio w2 is deviated to the LOW side from set target gear ratio t. Therefore, there occurs a problem that actual gear ratio w2 becomes predetermined gear ratio s for TOP at a timing k2 before control completion timing k1, and that actual gear ratio w2 at control completion timing k1 is smaller than predetermined gear ratio s for TOP.

As described above, variations in the output of potentiometer 19 lead to variations in the position of movable flange 32 for the detection value of potentiometer 19 among vehicles on the TOP side. As a result, there also occur variations in the gear ratio of belt type continuously variable transmission 800.

As shown in FIG. 2, control device 18 includes a determination section 206 and a first correction section 207. Determination section 206 and first correction section 207 function to improve accuracy in control to move movable flange 32 to a target position where the gear ratio of belt type continuously variable transmission 800 would become TOP, by reducing variations in such control.

Determination section 206 determines whether or not actual gear ratio w1, w2 of belt type continuously variable transmission 800 has become predetermined gear ratio s for TOP determined in advance. In this embodiment, it is determined whether or not actual gear ratio w1, w2 detected by actual gear ratio detection section 204 has become predetermined gear ratio s for TOP based on predetermined gear ratio s for TOP stored in second storage section 203, as shown in FIG. 7.

Determination section 206 can detect an event in which actual gear ratio w1 does not become predetermined gear ratio s for TOP even at control completion timing k1, and an event in which actual gear ratio w2 becomes predetermined gear ratio s for TOP before control completion timing k1. First correction section 207 corrects the operation amount of electric motor 17 based on the determination made by determination section 206.

Figure 9:
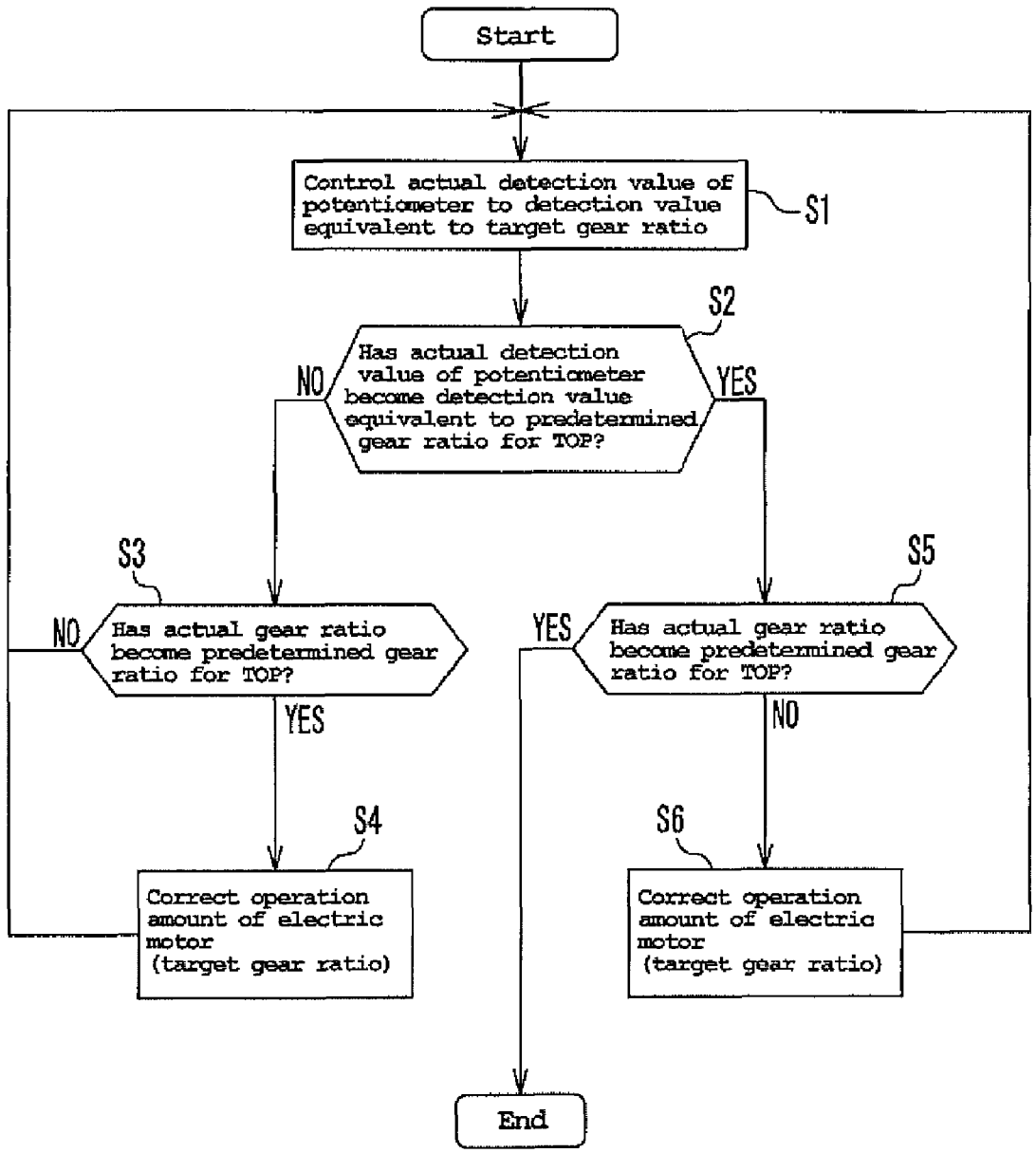
FIG. 9 is a control flowchart of a control device of the belt type continuously variable transmission in accordance with the embodiment of the present invention.

Such control is described with reference to the flowchart of FIG. 9. Control device 18 controls electric motor 17 based on the detection value of potentiometer 19 (S1). That is, target gear ratio setting section 201 sets the target gear ratio. Then, the detection value of potentiometer 19 in accordance with the target gear ratio (detection value equivalent to the target gear ratio) is derived from reference correlation v shown in FIG. 8. Then, operation amount setting section 205 sets the operation amount of electric motor 17, utilizing feedback of the actual detection value of potentiometer 19, such that the actual detection value of potentiometer 19 will become the detection value of potentiometer 19 (detection value equivalent to the target gear ratio). After operation amount setting section 205 sets the operation amount of electric motor 17 in this way, an operation signal in accordance with the operation amount is transmitted to electric motor 17.

Then, it is determined whether or not the control to bring the gear ratio of belt type continuously variable transmission 800 to the predetermined gear ratio for TOP has been completed (S2). This determination (S2) is made based on the detection value of potentiometer 19. Here, it is assumed that movable Range 32 is moved to the target position where the gear ratio of belt type continuously variable transmission 800 would become TOP. Therefore, the target gear ratio as a control target is predetermined gear ratio s for TOP. Thus, a detection value h1 of potentiometer 19 is calculated based on predetermined gear ratio s for TOP and reference correlation v, as shown in FIG. 8. Preferably, it is determined that the control has been completed when the actual detection value of potentiometer 19 has become detection value h1 equivalent to predetermined gear ratio s for TOP.

Then, where it is determined in S2 that the control has not been completed (NO), determination section 206 determines whether or not the actual gear ratio of belt type continuously variable transmission 800 has become the predetermined gear ratio for TOP determined in advance (S3). Actual gear ratio w1, w2 of belt type continuously variable transmission 800 is preferably calculated to determine whether or not actual gear ratio w1, w2 has become predetermined gear ratio s for TOP, as shown in FIG. 7.

Where it is determined in S3 that the actual gear ratio has not become the predetermined gear ratio for TOP (NO), the control of S1 is preferably continued.

Where the actual gear ratio (detection value of potentiometer 19) is deviated to the TOP side, as indicated by w2 in FIGS. 7 and 8, and actual gear ratio w2 has become predetermined gear ratio s for TOP at timing k2 before control completion timing k1, it is determined in S3 that the actual gear ratio has become the predetermined gear ratio for TOP. Where this determination is made (YES), first correction section 207 corrects the operation amount of electric motor 17 set by control device 18 such that the gear ratio will not become any smaller (S4).

The operation amount of electric motor 17 (target gear ratio) set by operation amount setting section 205 is corrected to keep the operation amount of electric motor 17 at timing k2 when it is determined in S3 that actual gear ratio w2 has become predetermined gear ratio s for TOP, as shown in FIG. 7 by broken line C. For example, it is preferable to store the operation amount of electric motor 17 at the time when it is determined that the actual gear ratio has become the predetermined gear ratio for TOP stored in second storage section 203, and to correct the operation amount of electric motor 17 set by control device 18 such that movable flange 32 of primary sheave 13 is kept at a position corresponding to the stored operation amount.

First correction section 207 may perform correction in any way as long as the operation amount of electric motor 17 (actuator) set by control device 18 is substantially corrected. For example, the target gear ratio set by target gear ratio setting section 201 may alternatively be corrected, unlike the embodiment described above. In addition, in the case where control device 18 sets the position of movable flange 32 as a control target, the position of the control target to be set for movable flange 32 may be corrected.

Figure 10:
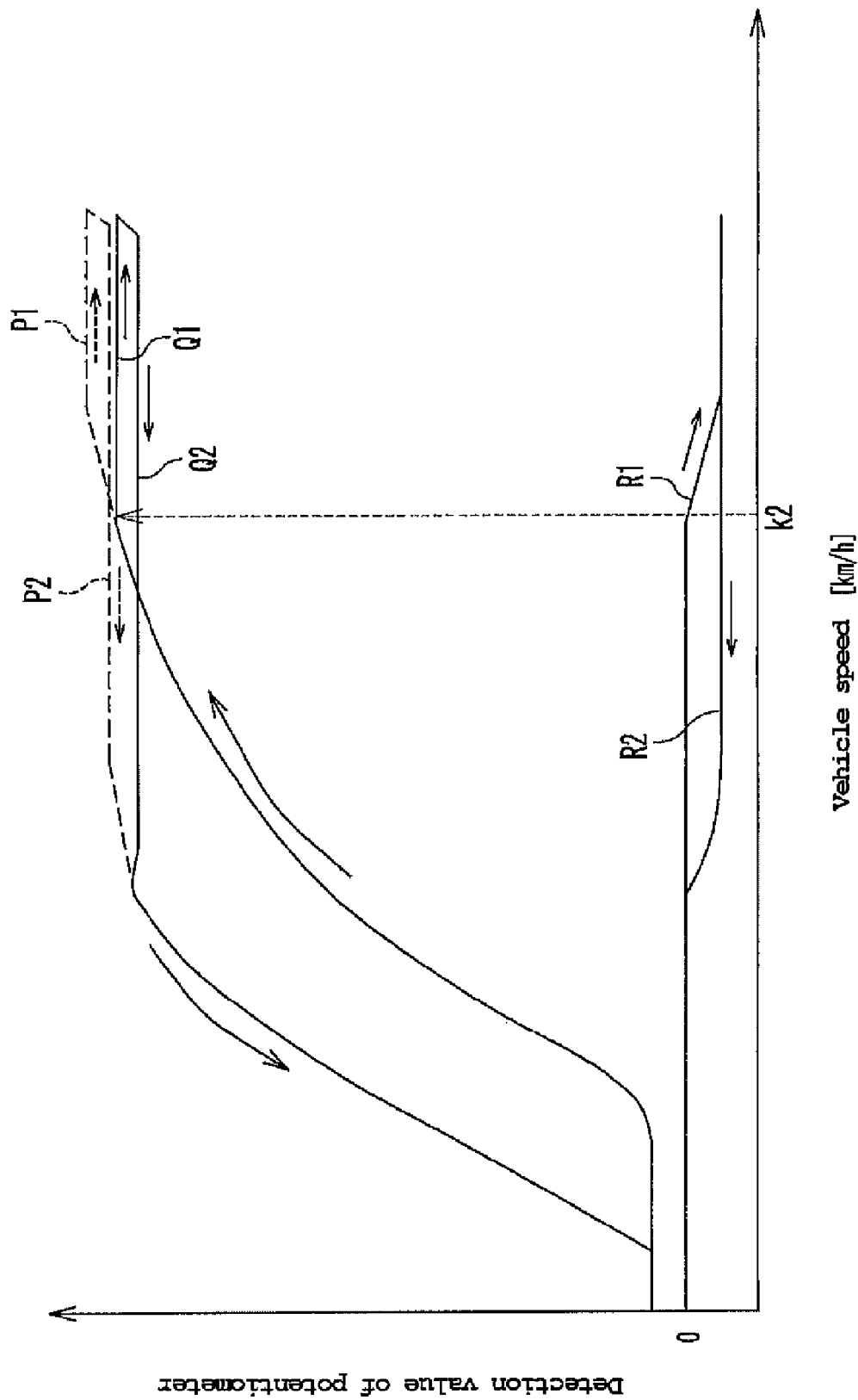
FIG. 10 is a graph showing a correlation between vehicle speed and the detection value of the potentiometer of the belt type continuously variable transmission in accordance with the embodiment of the present invention.

FIG. 10 shows the operation and correction amounts of electric motor 17 in terms of the detection value of potentiometer 19 for the case where the actual detection value of potentiometer 19 is deviated from reference correlation v to the TOP side as described above. In FIG. 10, the vertical axis represents the detection value of potentiometer 19 and the horizontal axis represents the vehicle speed. Broken lines P1, P2 indicate the actual detection value of potentiometer 19 that would be detected during control without correction by first correction section 207. P1 represents acceleration at full throttle, and P2 represents deceleration at fully closed throttle. A lower value is detected for the same gear ratio during deceleration at fully closed throttle (P2) than during acceleration at full throttle (P1). Solid lines Q1, Q2 indicate the actual detection value of potentiometer 19 detected with correction by first correction section 207. Q1 represents acceleration at full throttle, and Q2 represents deceleration at fully closed throttle. R1, R2 indicates the correction amount for Q1, Q2, respectively.

As shown in FIGS. 7 and 10, the correction is started at timing k2 when it is determined that the actual gear ratio has become predetermined gear ratio s for TOP, to set correction amount R1 so as to keep the position of movable flange 32 at timing k2. Then, correction amount R1 is added to operation amount P1 of electric motor 17 without correction to set operation amount Q1 of electric motor 17 with correction. As a result, the gear ratio is made closer to predetermined gear ratio s for TOP, as indicated by broken line C of FIG. 7. Such correction is maintained at and after timing k2 when it is determined that the actual gear ratio has become predetermined gear ratio s for TOP.

During subsequent deceleration at fully closed throttle, the correction is maintained until operation amount P2 of electric motor 17 without correction would become smaller than operation amount Q2 of electric motor 17 with correction, as shown in FIG. 10. This allows the gear ratio to vary smoothly.

Where it is determined in S2 that control has been completed (YES), determination section 206 determines whether or not the actual gear ratio of belt type continuously variable transmission 800 has become predetermined gear ratio s for TOP determined in advance (S5).

Where it is determined in FIG. 5 that the actual gear ratio has become the predetermined gear ratio for TOP (YES), control has been performed generally normally with little deviation of potentiometer 19, and preferably control is terminated without performing the correction process.

Where the actual gear ratio (detection value of potentiometer 19) is deviated to the LOW side, as indicated by w1 in FIGS. 7 and 8, and actual gear ratio w1 has not become predetermined gear ratio s for TOP even at control completion timing k1, it is determined in S5 that the actual gear ratio has not become the predetermined gear ratio for TOP. Where this determination is made (NO), first correction section 207 corrects the operation amount of electric motor 17 set by control device 18 such that the actual gear ratio will become predetermined gear ratio s for TOP (S6).

First correction section 207 corrects the operation amount of electric motor 17 set by control device 18 such that the actual gear ratio becomes smaller according to an amount of increase of the vehicle speed, as shown in FIG. 7 by broken line D. In this case, preferably, it is determined in advance how much the target gear ratio will be corrected in terms of the detection value of potentiometer 19 for an increase of the vehicle speed of 1 km/h, for example, in order to determine such a correction amount that will make the actual gear ratio closer to the target gear ratio as the vehicle speed increases.

Figure 11:
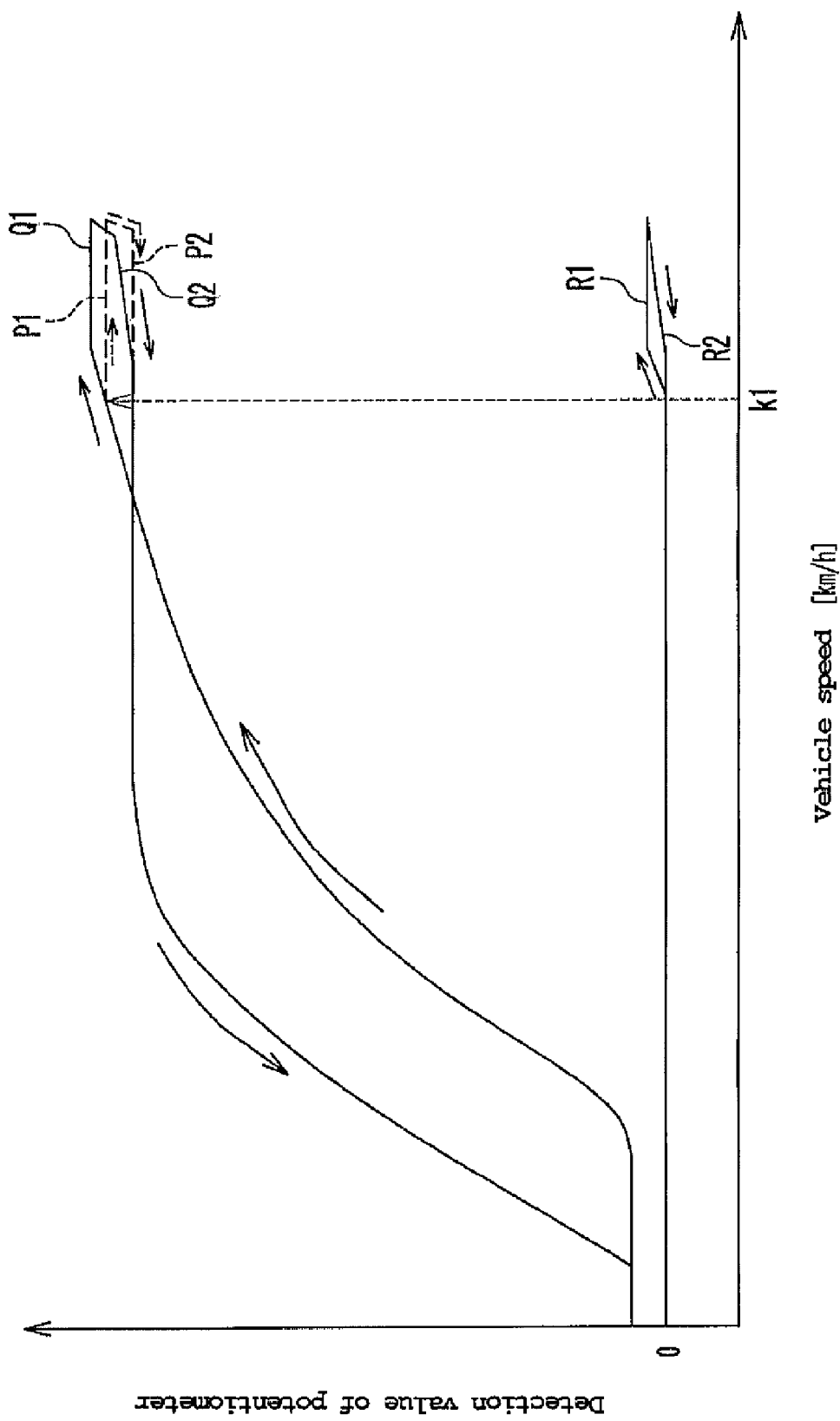
FIG. 11 is a graph showing a correlation between vehicle speed and the detection value of the potentiometer of the belt type continuously variable transmission in accordance with the embodiment of the present invention.

FIG. 11 shows the operation and correction amounts of the actuator in terms of the detection value of potentiometer 19 where the correlation between the actual detection value of potentiometer 19 and the gear ratio is deviated from reference correlation v to the LOW side as described above. In FIG. 11, the vertical axis represents the detection amount of potentiometer 19 and the horizontal axis represents the vehicle speed. Broken lines P1, P2 indicate the detection value of potentiometer 19 that would be detected during control without correction by first correction section 207. P1 represents acceleration at full throttle, and P2 represents deceleration at fully closed throttle. A lower value is detected for the same gear ratio during deceleration at fully closed throttle (P2) than during acceleration at full throttle (P1). Solid lines Q1, Q2 indicate the actual detection value of potentiometer 19 detected with correction by first correction section 207. Q1 represents acceleration at full throttle, and Q2 represents deceleration at fully closed throttle. R1, R2 indicates the correction amount for Q1, Q2, respectively.

As shown in FIGS. 7 and 11, the correction is started after it is determined in S5 that the actual gear ratio has not become the predetermined gear ratio for TOP. Then, correction amount R1 is set such that movable flange 32 will move to the TOP side according to an amount of increase of vehicle speed from timing k2 when it is determined in S2 that control has been completed. Then, correction amount R1 is added to operation amount P1 of electric motor 17 without correction to set operation amount Q1 of electric motor 17 with correction. As a result, the gear ratio is made closer to predetermined gear ratio s for TOP, as indicated by broken line D of FIG. 7. The correction is performed until it is determined that the actual gear ratio has become predetermined gear ratio s for TOP.

During subsequent deceleration at fully closed throttle, the correction amount is reduced according to an amount of reduction of the vehicle speed until the correction amount becomes zero, as indicated by R2. This allows the gear ratio to vary smoothly.

As described above, control device 18 improves the accuracy of the gear shift on the TOP side, by means of determination section 206 and first correction section 207, where the sensor reference position of potentiometer 19 is set based on the gear ratio on the LOW side.

An easy method to correct the deviation in the correlation described above over the entire region of the gear ratio is now described.

Control device 18 includes a second correction section 208 for correcting reference correlation v between the detection value of potentiometer 19 and the gear ratio stored in advance in control device 18 (first storage section 202).

The sensor reference position of potentiometer 19 is set on the side where the gear ratio of belt type continuously variable transmission 800 is LOW. First storage section 202 stores reference correlation v between the detection value of potentiometer 19 and the gear ratio. There are individual differences in the output characteristics of potentiometer 19 among vehicles, and the detection value of potentiometer 19 may deviate from reference correlation v to the LOW side (w1) or the TOP side (w2), as shown in FIG. 8.

Second correction section 208 corrects reference correlation v based on the proportion of $\Delta A / \Delta B$ at the position for TOP, $\Delta A$ being a change amount of the detection value of potentiometer 19 at the time when actual gear ratio (w1, w2) has become a predetermined gear ratio, and $\Delta B$ being a change amount of the detection value of potentiometer 19 derived based on reference correlation v.

In this way, actual correlation (w1, w2) is corrected based on the proportion of $\Delta A / \Delta B$ not only in the TOP region but also over the entire region from LOW to TOP, making it possible to reduce the deviation between reference correlation v and actual correlation (w1, w2), and therefore to bring the gear ratio of belt type continuously variable transmission 800 closer to the target gear ratio. This allows easy correction of the deviation in the correlation described above over the entire region of the gear ratio.

Various ways of correction for control of a gear ratio of a belt type continuously variable transmission in accordance with the present invention have been described. Such correction may be applied to not only variations between the detection value of the flange position detection sensor and the gear ratio due to the output characteristics of the potentiometer (flange position detection sensor), but also deviation in the correlation due to changes over time in the output characteristics, changes over years such as elongation and wear of the V-belt, component tolerances, and so forth.

Although a belt type continuously variable transmission and a control device therefor in accordance with an embodiment of the present invention have been described above, the belt type continuously variable transmission and the control method therefor in accordance with the present invention are not limited to the embodiment described above.

For example, the construction of belt type continuously variable transmission 800, the structure of groove width adjustment mechanism 16, the structure of flange position detection sensor 19, the configuration of control device 18, and so forth are not limited to those disclosed in the above embodiment.

In the embodiment described above, the sensor reference position of potentiometer 19 (flange position detection sensor) is set on the side where the gear ratio of belt type continuously variable transmission 800 is LOW, by way of example. However, the sensor reference position of the flange position detection sensor may not necessarily be set on the LOW side but may be set on the TOP side. In the case where the sensor reference position is set on the TOP side, the correlation between the detection value of the flange position detection sensor and the gear ratio may possibly vary among vehicles on the LOW side. In this case, the determination section determines whether or not the actual gear ratio of the belt type continuously variable transmission has become the predetermined gear ratio for LOW determined in advance.

Although belt type continuously variable transmission 800 is provided to a power unit of a motorcycle by way of example in the above embodiment, it may be applied to a wide range of vehicles other than motorcycles (for example, vehicles such as straddle type vehicles, scooter type vehicles, golf carts and four-wheeled buggies). Moreover, although a belt type continuously variable transmission provided to a power unit is disclosed by way of example, the present invention may be applied to a belt type continuously variable transmission provided separately from an engine.

As described above, the belt type continuously variable transmission and the control method therefor in accordance with the present invention can be widely utilized for belt type continuously variable transmissions provided to vehicles or the like.

What is claimed is:

1. A belt type continuously variable transmission comprising:
    a primary sheave and a secondary sheave each having a pair of flanges axially movable relative to each other;
    a belt wound around the sheaves;
    an actuator for moving the flanges; and
    a control device for controlling the actuator, the control device comprising:
    a determination section for
        (i) determining whether an actual detection value of a flange position detector has become a detection value equivalent to a predetermined gear ratio for TOP or LOW,
        (ii) determining whether an actual gear ratio of the belt type continuously variable transmission has become a predetermined gear ratio for TOP or LOW while controlling to move the flange to a target position where a gear ratio of the belt type continuously variable transmission would become TOP or LOW; and
    a first correction section for, based on results of (i) and (ii), correcting an operation amount of the actuator based on the determination made by the determination section in order to adjust a deviation from the predetermined gear ratio caused by moving the flange to the target position.

2. The belt type continuously variable transmission according to claim 1, wherein:
    the determination section determines whether the actual gear ratio has become the predetermined gear ratio for TOP; and
    where the determination section determines that the actual gear ratio has become the predetermined gear ratio for TOP before completion of control to move the flange to a target position where a gear ratio of the belt type continuously variable transmission would become TOP in absence of a deviation in the actual gear ratio, the first correction section corrects the operation amount of the actuator set by the control device such that the actual gear ratio will not become any smaller.

3. The belt type continuously variable transmission according to claim 1, wherein:
    the determination section determines whether the actual gear ratio has become the predetermined gear ratio for TOP; and
    where the determination section does not determine that the actual gear ratio has become the predetermined gear ratio for TOP even after completion of control to move the flange to a target position where a gear ratio of the belt type continuously variable transmission would become TOP, the first correction section corrects the operation amount of the actuator set by the control device such that the actual gear ratio will become the predetermined gear ratio for TOP.

4. The belt type continuously variable transmission according to claim 3, wherein the first correction section corrects the operation amount of the actuator set by the control device such that the actual gear ratio will become smaller according to an increase of a vehicle speed.

5. The belt type continuously variable transmission according to claim 1, wherein:
    the primary sheave and the secondary sheave each includes a fixed flange and a movable flange respectively mounted on a rotary shaft; and
    a width of a groove of the primary sheave is adjusted by moving the movable flange of the primary sheave with the actuator, and the movable flange of the secondary sheave is urged in a direction of reducing a width of a groove of the secondary sheave.

6. The belt type continuously variable transmission according to claim 1, comprising:
    a flange position detection sensor for detecting a position of the flange, the control device comprising:
    a target gear ratio setting section for setting a target gear ratio;
    a first storage section for storing correlation between a detection value of the flange position detection sensor and the gear ratio; and
    an operation amount setting section for setting the operation amount of the actuator based on information including the correlation stored in the first storage section such that the gear ratio of the belt type continuously variable transmission will become the target gear ratio set by the target gear ratio setting section.

7. The belt type continuously variable transmission according to claim 6, the control device comprising:
    a second storage section for storing the predetermined gear ratio for TOP or LOW; and
    an actual gear ratio detection section for detecting the actual gear ratio, wherein:
    the determination section determines whether the actual gear ratio detected by the actual gear ratio detection section has become the predetermined gear ratio for TOP or LOW based on the predetermined gear ratio for TOP or LOW stored in the second storage section; and
    the first correction section corrects the operation amount of the actuator set by the operation amount setting section based on the determination made by the determination section.

8. The belt type continuously variable transmission according to claim 6, wherein the flange position detection sensor is an angle sensor mounted on a rotary shaft for rotation in conjunction with a mechanism for moving the flange.

9. The belt type continuously variable transmission according to claim 6, wherein:
the flange position detection sensor is a sensor of which reference is set to a first state where the flange is positioned on one side of its movable range, and of which detection value changes according to an amount of movement of the flange toward a second state where the flange is positioned on the other side of the movable range;
the first storage section stores reference correlation between the detection value of the flange position detection sensor and the gear ratio; and
the control device comprises a second correction section for correcting the reference correlation stored in the first storage section based on a ratio of $\Delta A/\Delta B$ in a state closer to the second state, $\Delta A$ being a change amount of the detection value of the flange position detection sensor at a time when the actual gear ratio has become a predetermined gear ratio, and $\Delta B$ being a change amount of the detection value of the flange position detection sensor derived based on the reference correlation stored in the first storage section.

10. The belt type continuously variable transmission according to claim 9, wherein the first state is on a side where the gear ratio of the belt type continuously variable transmission is LOW.

11. The belt type continuously variable transmission according to claim 9, wherein the first state is on a side where the gear ratio of the belt type continuously variable transmission is TOP.

12. The belt type continuously variable transmission according to claim 6, wherein the actual gear ratio detection section calculates the actual gear ratio based on a ratio between an input speed to and an output speed from the belt type continuously variable transmission.

13. A vehicle comprising the belt type continuously variable transmission of claim 1.

14. The vehicle according to claim 13, wherein the vehicle is selected from a group comprising a motorcycle, a straddle type vehicle, a scooter type vehicle, a golf cart and a four-wheeled buggy.

15. The belt type continuously variable transmission of claim 1, wherein the first correction section corrects the operation amount if a result of both (i) and (ii) is negative, or if a result of (i) is affirmative but a result of (ii) is negative.

16. The belt type continuously variable transmission of claim 1, wherein the first correction section corrects the operation amount to cause to the actual gear ratio to become smaller according to an amount of increase of a vehicle speed.

17. A belt type continuously variable transmission comprising:
a primary sheave and a secondary sheave each having a pair of flanges axially movable relative to each other;
a belt wound around the sheaves;
an actuator for moving the flanges;
a flange position detection sensor for detecting a position of the flange; and
a control device for controlling the actuator, the flange position detection sensor being a sensor of which reference is set to a first state where the pair of flanges of the primary sheave are positioned in one of a TOP state and a LOW state, and of which detection value changes according to an amount of movement of the flanges toward a second state where the flanges are positioned in the other state, and the control device comprising:
a first storage section for storing reference correlation between the detection value of the flange position detection sensor and a gear ratio; and
a second correction section for correcting the reference correlation stored in the first storage section based on a ratio of $\Delta A/\Delta B$, $\Delta A$ being a change amount of the detection value of the flange position detection sensor at a time when the actual gear ratio has become a predetermined gear ratio in a state closer to the second state, and $\Delta B$ being a change amount of the detection value of the flange position detection sensor derived based on the reference correlation stored in the first storage section in a state closer to the second state.

18. A control device provided for a belt type continuously variable transmission having a primary sheave and a secondary sheave each having a pair of flanges axially movable relative to each other, and a belt wound around the sheaves, the control device being configured to control an actuator for moving the flange and comprising:
a determination section for
(i) determining whether an actual detection value of a flange position detector has become a detection value equivalent to a predetermined gear ratio for TOP or LOW,
(ii) determining whether an actual gear ratio of the belt type continuously variable transmission has become a predetermined gear ratio for TOP or LOW while controlling to move the flange to a target position where a gear ratio of the belt type continuously variable transmission would become TOP or LOW; and
a first correction section for, based on results of (i) and (ii), correcting an operation amount of the actuator based on the determination made by the determination section in order to adjust a deviation from the predetermined gear ratio caused by moving the flange to the target position.

19. The control device according to claim 18, wherein:
the determination section determines whether the actual gear ratio has become the predetermined gear ratio for TOP; and
where the determination section determines that the actual gear ratio has become the predetermined gear ratio for TOP before completion of control to move the flange to a target position where a gear ratio of the belt type continuously variable transmission would become TOP in absence of a deviation in the actual gear ratio, the first correction section corrects the operation amount of the actuator set by the control device such that the actual gear ratio will not become any smaller.

20. The control device according to claim 18, wherein:
the determination section determines whether the actual gear ratio has become the predetermined gear ratio for TOP; and
where the determination section does not determine that the actual gear ratio has become the predetermined gear ratio for TOP even after completion of control to move the flange to a target position where a gear ratio of the belt type continuously variable transmission would become TOP, the first correction section corrects the operation amount of the actuator set by the control device such that the actual gear ratio will become the predetermined gear ratio for TOP.

21. The control device according to claim 20, wherein the first correction section corrects the operation amount of the actuator set by the control device such that the actual gear ratio will become smaller according to an increase of a vehicle speed.

22. The control device according to claim 18, wherein:
the primary sheave and the secondary sheave each includes a fixed flange and a movable flange respectively mounted on a rotary shaft; and
a width of a groove of the primary sheave is adjusted by moving the movable flange of the primary sheave with the actuator, and the movable Range of the secondary sheave is urged in a direction of reducing a width of a groove of the secondary sheave.

23. The control device according to claim 18, comprising:
a flange position detection sensor for detecting a position of the flange;
a target gear ratio setting section for setting a target gear ratio;
a first storage section for storing correlation between a detection value of the flange position detection sensor and the gear ratio; and
an operation amount setting section for setting the operation amount of the actuator based on information including the correlation stored in the first storage section such that the gear ratio of the belt type continuously variable transmission will become the target gear ratio set by the target gear ratio setting section.

24. The control device according to claim 23, comprising:
a second storage section for storing the predetermined gear ratio for TOP or LOW;
and an actual gear ratio detection section for detecting the actual gear ratio, wherein:
the determination section determines whether the actual gear ratio detected by the actual gear ratio detection section has become the predetermined gear ratio for TOP or LOW based on the predetermined gear ratio for TOP or LOW stored in the second storage section; and
the first correction section corrects the operation amount of the actuator set by the operation amount setting section based on the determination made by the determination section.

25. The control device according to claim 23, wherein the flange position detection sensor is an angle sensor mounted on a rotary shaft for rotation in conjunction with a mechanism for moving the flange.

26. The control device for according to claim 23, wherein:
the flange position detection sensor is a sensor of which reference is set to a first state where the flange is positioned on one side of its movable range, and of which detection value changes according to an amount of movement of the flange toward a second state where the flange is positioned on the other side of the movable range;
the first storage section stores reference correlation between the detection value of the flange position detection sensor and the gear ratio; and
the control device comprises a second correction section for correcting the reference correlation stored in the first storage section based on a ratio of $\Delta A/\Delta B$ in a state closer to the second state, $\Delta A$ being a change amount of the detection value of the flange position detection sensor at a time when the actual gear ratio has become a predetermined gear ratio, and $\Delta B$ being a change amount of the detection value of the flange position detection sensor derived based on the reference correlation stored in the first storage section.

27. The control device according to claim 26, wherein the first state is on a side where the gear ratio of the belt type continuously variable transmission is LOW.

28. The control device according to claim 26, wherein the first state is on a side where the gear ratio of the belt type continuously variable transmission is LOW.

29. The control device according to claim 23, wherein the actual gear ratio detection section calculates the actual gear ratio based on a ratio between an input speed to and an output speed from the belt type continuously variable transmission.

30. A control device provided for a belt type continuously variable transmission having a primary sheave and a secondary sheave each having a pair of flanges axially movable relative to each other, and a belt wound around the sheaves, the control device being configured to control an actuator for moving the flange and comprising:
a flange position detection sensor for detecting a position of the flange, of which reference is set to a first state where the pair of flanges of the primary sheave are positioned in one of a TOP state and a LOW state, and of which detection value changes according to an amount of movement of the flanges toward a second state where the flanges are positioned in the other state;
a first storage section for storing reference correlation between the detection value of the flange position detection sensor and a gear ratio; and
a second correction section for correcting the reference correlation stored in the first storage section based on a ratio of $\Delta A/\Delta B$, $\Delta A$ being a change amount of the detection value of the flange position detection sensor at a time when the actual gear ratio has become a predetermined gear ratio in a state closer to the second state, and $\Delta B$ being a change amount of the detection value of the flange position detection sensor derived based on the reference correlation stored in the first storage section in a state closer to the second state.

* * * * *